July 14, 1936.   E. CLYMER   2,047,854
RATE OF FLOW GAUGE
Filed March 15, 1935
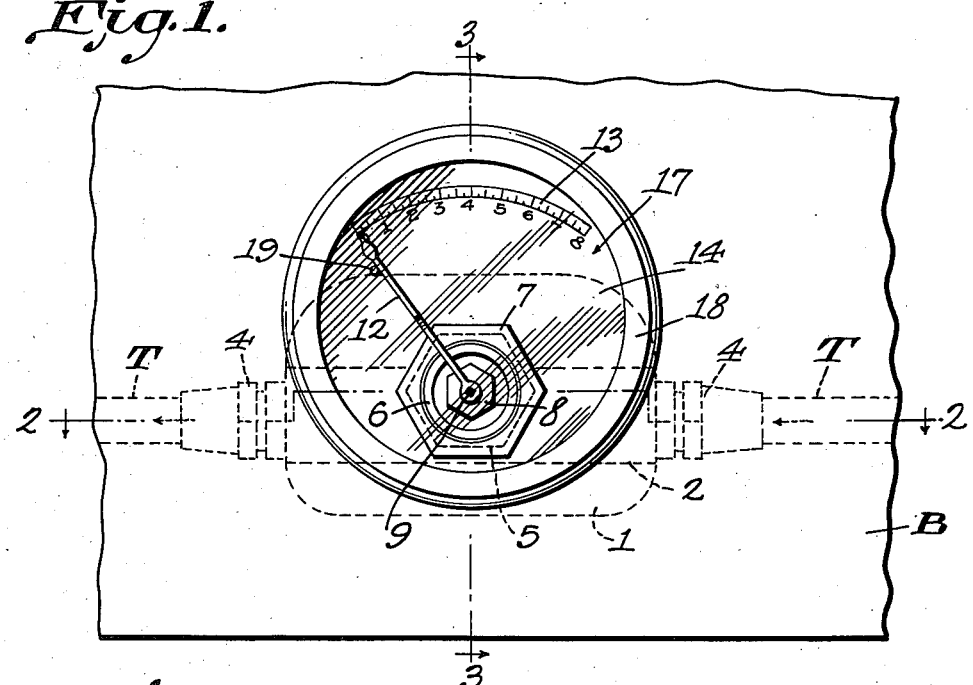
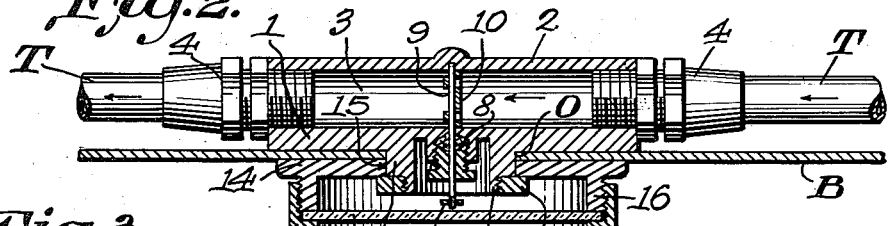
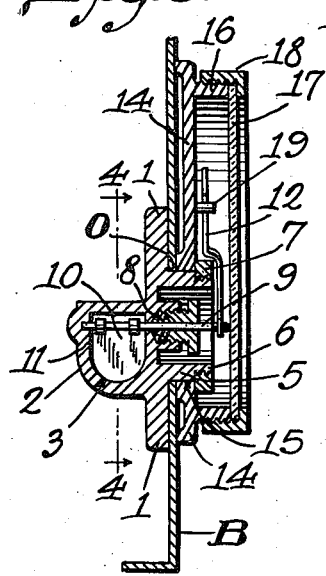
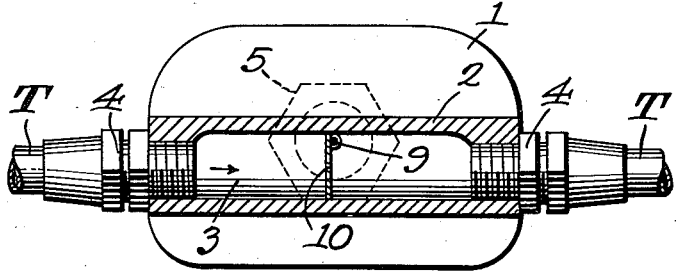
Inventor
Emerson Clymer
By CA Snow & Co.
Attorneys.

Patented July 14, 1936

2,047,854

UNITED STATES PATENT OFFICE 2,047,854

RATE OF FLOW GAUGE

Emerson Clymer, Quakertown, Pa.

Application March 15, 1935, Serial No. 11,358

1 Claim. (Cl. 73—228)

This invention relates to a gauge designed for indicating the rate of flow of liquid fuel to an internal combustion engine and it is designed primarily for use on automobiles motor boats and the like whereby the relative efficiency of fuels can be determined easily and it is possible also to ascertain the amount of fuel being used at a given speed.

A further object is to provide a device of this character which can be applied readily to the instrument board or any other suitable part of the vehicle and which can be easily coupled to the fuel line.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1 is a front elevation of the device in position on an instrument board a portion of which has been shown.

Figure 2 is a section on line 2—2 Figure 1.

Figure 3 is a section on line 3—3 Figure 1.

Figure 4 is a section on line 4—4 Figure 3.

Referring to the figures by characters of reference, 1 designates a plate having an enlargement 2 extending longitudinally along one face, said enlargement being formed with a longitudinal passage 3 having coupling devices 4 at its ends for engagement with tubes T used for conveying fuel to an engine.

Extending from the opposite side of the plate 1 is a boss 5 having a reduced end 6 providing an annular shoulder at its base, said reduced end being screw threaded for engagement by a nut 7. Fitted within the boss is a packing gland 8 in which a spindle 9 is mounted for free rotation. This spindle extends transversely of the upper portion of passage 3 and supports a flap 10 which extends across the passage and is adapted to swing about the axis of the spindle. To facilitate this swinging action the upper portions of the walls of passage 3 can be made parallel as shown at 11 in Figure 3 and the sides of the flap 10 can be similarly shaped so that the flap, when in normal position, will act as an intermediate closure for the passage.

Detachably connected to spindle 9 so as to be supported close to but out of contact with the boss 5 is an index or pointer 12 the end of which is designed to swing over a graduated scale 13 formed on a disk 14. This disk has an eccentrically located opening 15 for the reception of the boss 5 and projecting from the disk is a circular screw threaded flange 16 to which a transparent plate 17 is adapted to be clamped by a threaded ring 18 engaging flange 16.

In practice the ring 18 and transparent plate 17 are removed, the index or pointer 12 is detached from spindle 9 and the nut 7 is unscrewed from boss 5. An opening O is then formed in the instrument board B or the like on which the device is to be mounted, this opening being so proportioned as to permit the boss 5 to fit snugly therein. Plate 1 to which the tubes T have been joined is placed back of the supporting structure B and the boss 5 is inserted through opening O. Disk 14 is then placed upon the boss 5 and against structure B after which the parts are secured together by means of nut 7, this nut serving to bind plate 1 and disk 14 upon opposed faces of the structure B so that they will not shift relative thereto. When in proper position the flap or blade 10 will hang vertically and the index or pointer 12 will be extended to one end of the scale 13 where it can rest against a stop pin 19 if so desired, it being held there by the weight of the hanging flap 10. The transparent plate 17 is replaced on flange 16 and secured by ring 18 and the device is then ready for use.

During the operation of the engine the fuel will be forced thereto in the usual manner, passing through the tubes T and the passage 3. The pressure of the fuel upon the flap or blade 10 will cause said flap to shift against the force of gravity and away from its normal position in order that the fuel may flow past it. This movement of the flap will produce a swinging movement of the index or pointer 12 and the amount of movement will depend upon the volume and speed of flow against and past the flap. Thus the scale 13, which is properly calibrated relative to the movement of the flap 10 and pointer 12, will constitute a means for accurately indicating this flow of fuel and by means thereof it is possible to determine the relative merits of different fuels for driving an engine at a predetermined speed and also the amount of fuel required to drive the engine at different speeds.

What is claimed is:

A rate of flow gauge including a plate having an enlargement with a passage therethrough, a boss extending from the plate with a reduced threaded end and an annular shoulder at the base of said end, a spindle journaled for free rotation in the boss and plate and extending across the top of the passage, a flap supported by the spindle within and normally held by gravity in position to close the passage, a pointer detachably connected to one end of the spindle, a disk mounted on the boss, and having calibrated graduations cooperating with the pointer, a stop for limiting the movement of the pointer in one direction, said flap constituting means for holding the pointer by gravity pressed normally against said stop, means engaging the threaded portion of the boss for fastening the boss within the disk and binding the disk and plate upon a support, and a detachable cover for the disk and pointer.

EMERSON CLYMER.